(12) United States Patent
Shih et al.

(10) Patent No.: US 7,320,726 B2
(45) Date of Patent: Jan. 22, 2008

(54) HYDROGEN STORAGE APPARATUS

(76) Inventors: Chih-Kang Shih, H Bank Technology Inc., 3 Fl.-1, No. 310, Sunglung Rd., Taipei City (TW) 11058; George Huang, H Bank Technology Inc., 3 Fl.-1, No. 310, Sunglung Rd., Taipei City (TW) 11058; Vahan Beibutian, H Bank Technology Inc., 3 Fl.-1, No. 310, Sunglung Rd., Taipei City (TW) 11058

( * ) Notice: Subject to any disclaimer, the term of this patent is extended or adjusted under 35 U.S.C. 154(b) by 399 days.

(21) Appl. No.: 11/038,720

(22) Filed: Jan. 20, 2005

(65) Prior Publication Data

US 2006/0144238 A1 Jul. 6, 2006

(30) Foreign Application Priority Data

Dec. 31, 2004 (TW) ................ 93141914 A (51) Int. Cl.
*F17C 11/00* (2006.01)
(52) U.S. Cl. .......................... 96/154; 206/0.7
(58) Field of Classification Search ............... 96/108, 96/134, 154; 420/900; 206/0.7; 502/526; 423/248, 648.1
See application file for complete search history.

(56) References Cited

U.S. PATENT DOCUMENTS

| | | | | |
|---|---|---|---|---|
| 4,457,136 | A | * | 7/1984 | Nishizaki et al. ............ 62/46.2 |
| 4,609,038 | A | * | 9/1986 | Ishikawa et al. ....... 165/104.12 |
| 4,667,815 | A | * | 5/1987 | Halene ....................... 206/0.7 |
| 6,015,041 | A | * | 1/2000 | Heung ......................... 206/70 |
| 6,503,584 | B1 | * | 1/2003 | McAlister .................. 428/34.1 |
| 6,626,323 | B2 | | 9/2003 | Stetson et al. |
| 6,666,034 | B1 | | 12/2003 | Guan et al. |
| 6,709,497 | B2 | | 3/2004 | Myasnikov et al. |
| 2002/0100369 | A1 | * | 8/2002 | Kuriiwa et al. ............... 96/146 |
| 2005/0051294 | A1 | * | 3/2005 | Fujita et al. .................. 165/10 |
| 2005/0188847 | A1 | * | 9/2005 | Fujita et al. .................. 96/126 |
| 2005/0211573 | A1 | * | 9/2005 | Myasnikov et al. ......... 206/0.7 |
| 2006/0266219 | A1 | * | 11/2006 | Ovshinsky et al. ........... 96/108 |

FOREIGN PATENT DOCUMENTS

| JP | 62-288495 A | * | 12/1987 |
|---|---|---|---|
| JP | 63-035401 A | * | 2/1988 |

* cited by examiner

*Primary Examiner*—Frank M. Lawrence
(74) *Attorney, Agent, or Firm*—Troxell Law Office, PLLC (57) ABSTRACT

The present invention provides a hydrogen storage apparatus comprising a hydrogen storage canister defining a longitudinal axis, at least one first partition, and at least one second partition. The at least one first partition is adapted to divide the hydrogen storage canister into at least one compartment. The at least one second partition is adapted to divide the at least one compartments into a plurality of sub-compartments into which the hydrogen storage alloy is disposed. The at least one second partition comprises a plurality of cells having a cell wall arranged in a honeycomb configuration, and the cell wall of each of the cells is perpendicular to the longitudinal axis. The second partition has a rectangle-shaped or fan-shaped honeycomb configuration. Accordingly, the efficiency of heat transfer is better and the hydrogen storage apparatus is safer when the hydrogen is absorbed or released by the hydrogen storage apparatus.

10 Claims, 12 Drawing Sheets

HYDROGEN STORAGE APPARATUS

BACKGROUND OF THE INVENTION

1. Field of the Invention

The present invention relates to a hydrogen storage apparatus, and more particularly to a hydrogen storage apparatus for storing a hydrogen storage alloy, such that the efficiency of heat transfer is better when the hydrogen is absorbed or released by the hydrogen storage apparatus, and the hydrogen storage apparatus is safer because the stress imposed on the hydrogen storage alloy is uniform.

2. Description of the Prior Art

In the past considerable attention has been given to the use of hydrogen as a fuel or fuel supplement. While the world's oil reserves are rapidly being depleted, the supply of hydrogen remains virtually unlimited. Furthermore, hydrogen, although presently more expensive than petroleum, is a relatively low cost fuel. Hydrogen has the highest density of energy per unit weight of any chemical fuel and is essentially non-polluting since the main by-product of burning hydrogen is water.

While hydrogen has wide potential application as a fuel, a major drawback in its utilization, especially in mobile uses such as the powering of vehicles, has been the lack of acceptable hydrogen storage medium. Conventionally, hydrogen has been stored in a pressure vessel under a high pressure or stored as a cryogenic liquid, being cooled to an extremely low temperature. Storage of hydrogen as a compressed gas involves the use of large and bulky vessels. Additionally, transfer is very difficult, since the hydrogen is stored in a large-sized vessel; amount of hydrogen stored in a vessel is limited, due to low density of hydrogen. Furthermore, storage as a liquid presents a serious safety problem when used as a fuel for motor vehicles since hydrogen is extremely flammable. Moreover, liquid hydrogen is expensive to produce.

Alternatively, certain metals and alloys have been known to permit reversible storage and release of hydrogen. In this regard, they have been considered as a superior hydrogen-storage material, due to their high hydrogen-storage efficiency. Many metal alloys are recognized as having suitability for hydrogen storage in their atomic and crystalline structures as hydride materials. While this storage method holds promise to be ultimately convenient and safe; improvements in efficiency and safety are always welcome. For example, it is known that heat transfer capability can enhance or inhibit efficient exchange of hydrogen into and out of metal alloys useful in hydride storage systems. As a general matter, release of hydrogen from the crystal structure of a metal hydride requires input of some level of energy, normally heat. Placement of hydrogen within the crystal structure of a metal, metal alloy, or other storage system generally releases energy, normally heat.

The heat released from hydrogenation of hydrogen storage alloys must be removed. Heat ineffectively removed can cause the hydriding process to slow down or terminate. This becomes a serious problem, which prevents fast charging. During fast charging, the hydrogen storage alloy is quickly hydrogenated and considerable amounts of heat are produced. Furthermore, after the hydrogen storage alloy is used for a period of time, some particles may collapse. The collapsed particles will gradually gather at the bottom of the hydrogen storage canister. When the hydrogen storage alloy is hydrided, it will generally expand and the particles at the bottom will swell about 20%, such that the hydrogen storage canister will deform due to non-uniform stress and, often crack. For example, "Hydrogen storage and transportation system" disclosed in U.S. Pat. No. 6,666,034 has the above-mentioned disadvantage.

Furthermore, the hydrogen storage unit disclosed in U.S. Pat. No. 6,626,323 still cannot effectively transfer heat and prevent the particles of the hydrogen storage alloy from shifting. Moreover, in U.S. Pat. No. 6,709,497, since the hydrogen storage structure utilizes at least one heat exchanger tube for transferring heat, the efficiency of heat transfer in the structure is worse, the design of the structure is more complicated, and the cost is higher correspondingly.

Accordingly, the objective of the present invention is to provide a hydrogen storage apparatus for improving the efficiency of heat transfer and the issue of safety, so as to solve the above-mentioned problems.

SUMMARY OF THE INVENTION

The objective of the present invention is to provide a hydrogen storage apparatus for storing a hydrogen storage alloy, so as to improve the efficiency of heat transfer while the hydrogen is absorbed or released by the hydrogen storage apparatus.

Another objective of the present invention is to provide hydrogen storage apparatus for storing a hydrogen storage alloy. After the hydrogen storage alloy is used for a period of time, some particles may collapse. The hydrogen storage apparatus of the present invention can reduce the movement of the particles collapsed from the hydrogen storage alloy and further prevent the hydrogen storage canister from deforming.

According to a preferred embodiment of the present invention, the hydrogen storage apparatus includes a hydrogen storage canister, at least one first partition, and at least one second partition. The hydrogen storage canister defines a longitudinal axis. The least one first partition is adapted to divide the hydrogen storage canister into at least one compartment. The least one second partition is adapted to divide the at least one compartment into a plurality of sub-compartments into which the hydrogen storage alloy is disposed. The at least one second partition has a plurality of cells having a cell wall arranged in a honeycomb configuration. The cell wall of each of the plurality of cells is perpendicular to the longitudinal axis. The hydrogen storage apparatus further includes at least one second filter for covering the outside of the at least one second partition.

Therefore, the hydrogen storage apparatus of the present invention not only improves the efficiency of heat transfer but also ensures the collapsed particles being in each of the cells, so as to prevent the hydrogen storage canister from deforming resulted from non-uniform stress caused by larger movement of the collapsed particles. Moreover, the hydrogen storage apparatus is suitable for the application of vertical type or horizontal type.

The advantage and spirit of the invention may be understood by the following recitations together with the appended drawings.

DETAILED DESCRIPTION OF THE INVENTION

Figure 1:
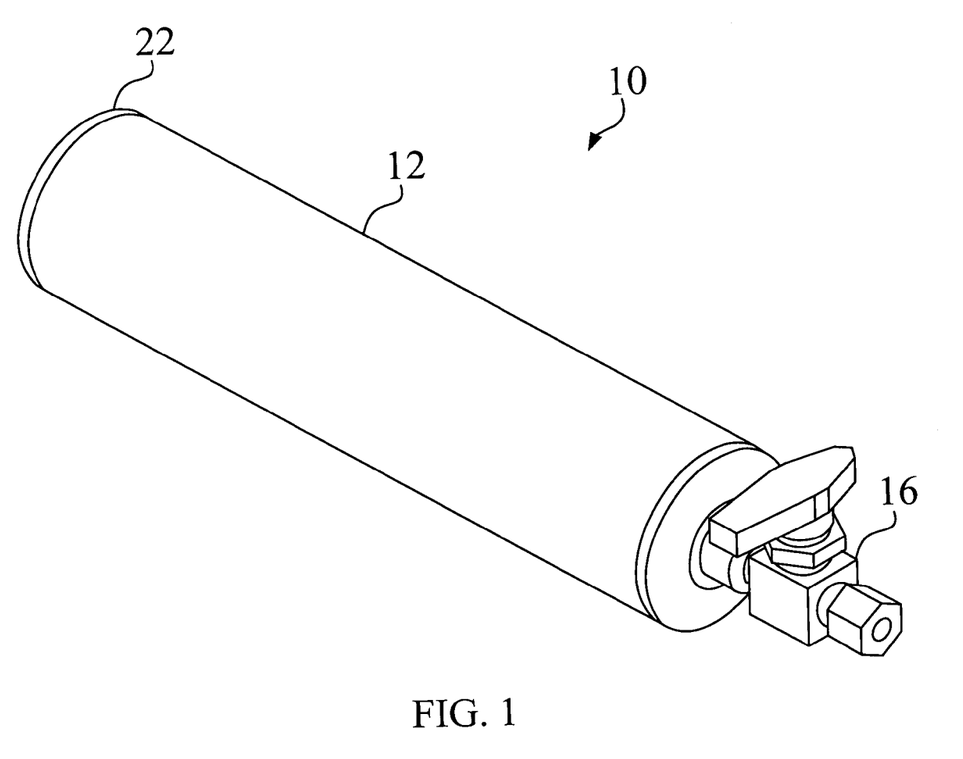
FIG. 1 is an outside view illustrating a hydrogen storage apparatus according to a preferred embodiment of the present invention.
Figure 2:
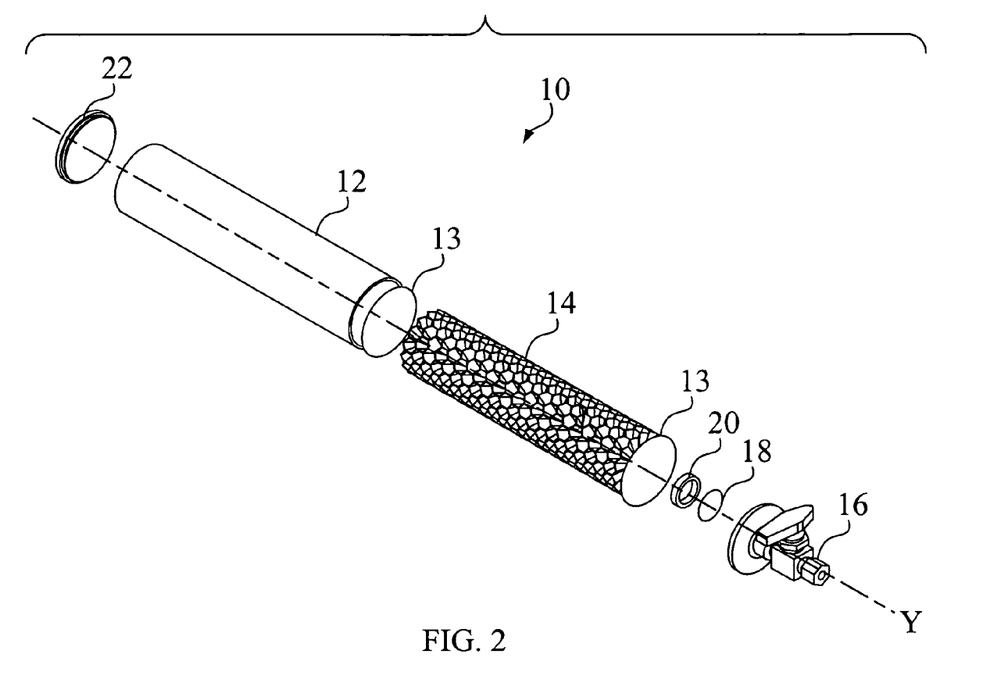
FIG. 2 is an exploded view illustrating the hydrogen storage apparatus shown in FIG. 1.
Figure 3:
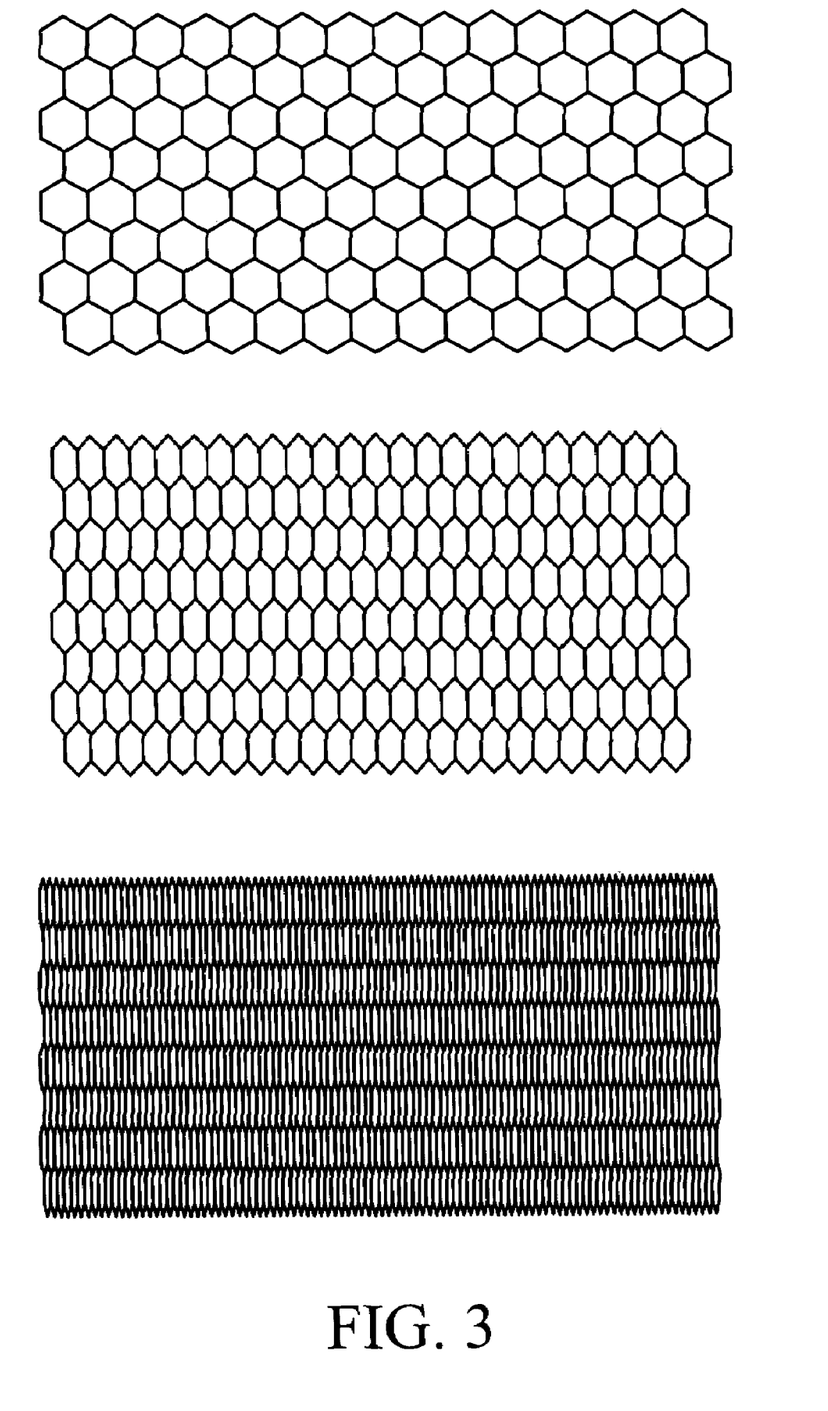
FIG. 3 is an expanded view illustrating three second partitions, shown in FIG. 2, with different density.

Referring to FIGS. 1 through 3, FIG. 1 is an outside view illustrating a hydrogen storage apparatus 10 according to a preferred embodiment of the present invention. FIG. 2 is an exploded view illustrating the hydrogen storage apparatus 10 shown in FIG. 1. FIG. 3 is an expanded view illustrating three second partitions 14, shown in FIG. 2, with different density. The hydrogen storage apparatus 10 is used for storing a hydrogen storage alloy (not shown). As shown in FIG. 2, the hydrogen storage apparatus 10 includes a hydrogen storage canister 12, at least one first partition 13 (functioning as an alloy holding separator), at least one second partition 14, a control valve 16, a first filter 18, a ring 20, and a bottom cover 22. The hydrogen storage canister 12 defines a longitudinal axis Y. In this embodiment, the hydrogen storage apparatus 10 includes two first partitions 13 and two second partitions 14. The first partition 13 is a filter and adapted to divide the hydrogen storage canister 12 into at least one compartment. The first partition 13 can filter hydrogen and prevent the collapsed particles from passing through. In other words, only hydrogen can pass through the first partition 13.

The control valve 16 is used for controlling the flow of hydrogen into and out of the hydrogen storage canister 12. The ring 20 is used for fixing the corresponding first filter 18 onto the bottom of the corresponding control valve 16, and the first filter 18 only permits hydrogen to pass through, so as to prevent the collapsed particles from shifting out while hydrogen is absorbed or released by the hydrogen storage apparatus 10. In a preferred embodiment, the porosity of the first filter 18 is designed to be under 1.0 micrometer. The bottom cover 22 is used for covering the bottom of the hydrogen storage canister 12 to prevent hydrogen and the hydrogen storage alloy from escaping, as shown in FIG. 1.

The second partition 14 is adapted to divide the at least one compartment into a plurality of sub-compartments into which the hydrogen storage alloy is disposed. The second partition 14 includes a plurality of cells having a cell wall arranged in a honeycomb configuration. The cell wall of each of the plurality of cells is perpendicular to the longitudinal axis Y. The hydrogen storage alloy is disposed in each cell of the second partition 14, so the collapsed particles of the hydrogen storage alloy will not gather at the bottom of the hydrogen storage canister 12. Furthermore, the second partition 14 is flexible, such that the size of the plurality of sub-compartments is adjustable, as shown in FIG. 3. Accordingly, the size of the plurality of sub-compartments can be changed based on various requirements, so as to improve the efficiency of heat transfer.

Figure 4A:
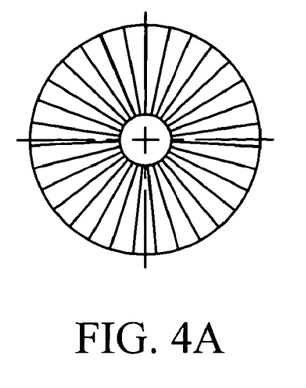
FIG. 4A is a top view illustrating the second partition shown in FIG. 2.
Figure 4B:
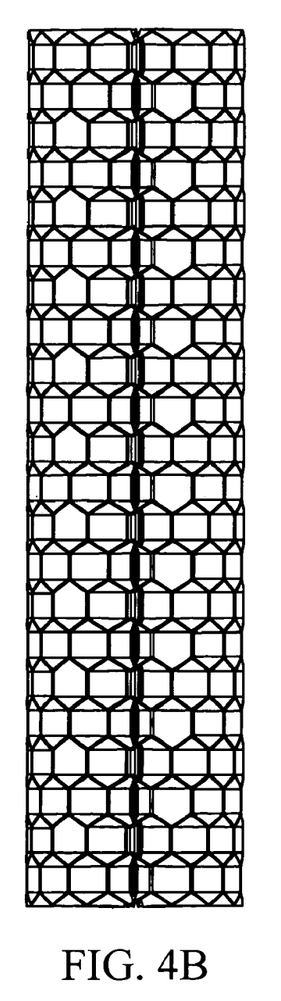
FIG. 4B is a side view illustrating the second partition shown in FIG. 2.

Referring to FIG. 4A and FIG. 4B, FIG. 4A is a top view illustrating the second partition 14 shown in FIG. 2. FIG. 4B is a side view illustrating the second partition 14 shown in FIG. 2. Because the cell wall of each cell of the second partition 14 is perpendicular to the longitudinal axis Y, the area that second partition 14 contacts the inner wall of the hydrogen storage canister 12 is increased, so as to improve the efficiency of heat transfer, as shown in FIG. 4B. Both the top and bottom surface of the second partition 14 have a fan-shaped honeycomb configuration as shown in FIG. 4A. Moreover, the hydrogen storage apparatus 10 further includes at least one second filter (not shown) for covering the outside of the second partition 14 to ensure the collapsed particles being in each of the cells, so as to prevent the hydrogen storage canister 12 from deforming resulted from non-uniform stress caused by larger movement of the collapsed particles. Because the hydrogen storage alloy is restrained in each cell of the second partition 14, the hydrogen storage apparatus 10 of the present invention is suitable for the application of vertical type or horizontal type.

Figure 5:
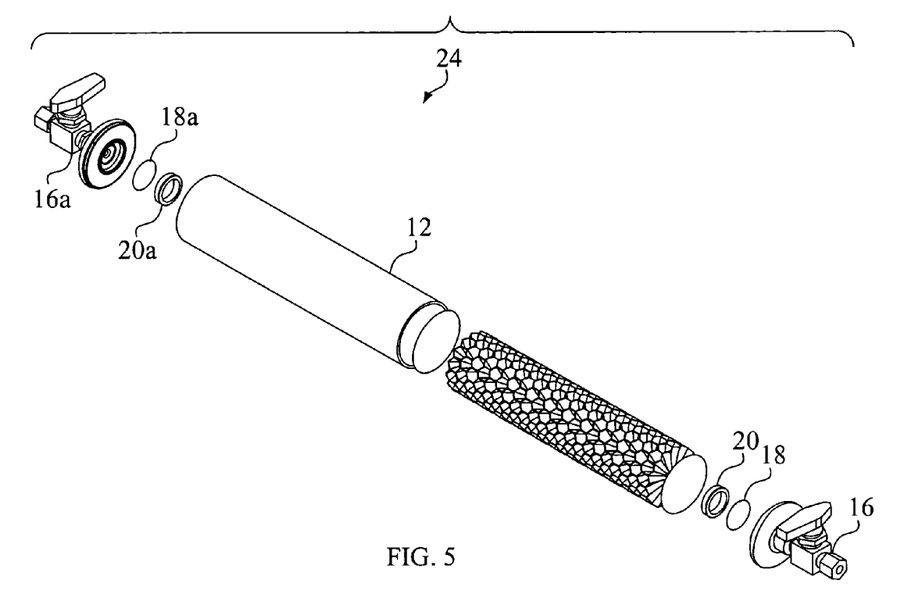
FIG. 5 is an exploded view illustrating a hydrogen storage apparatus according to another preferred embodiment of the present invention.

Referring to FIG. 5, FIG. 5 is an exploded view illustrating a hydrogen storage apparatus 24 according to another preferred embodiment of the present invention. The main difference between the hydrogen storage apparatus 24 and the hydrogen storage apparatus 10 is that the hydrogen storage apparatus 24 replaces the bottom cover 22 of the hydrogen storage apparatus 10 by a control valve 16a, a first filter 18a, and a ring 20a. The function and principle of the control valve 16a, the first filter 18a, and the ring 20a are respectively the same as the control valve 16, the first filter 18, and the ring 20. When the hydrogen storage apparatus 24 absorbs hydrogen completely, the control valves 16 and 16a may be opened at the same time, and hydrogen with high purity can be blown into the hydrogen storage canister 12. Accordingly, the gas impurities, not absorbed by the hydrogen storage alloy, will be blown out of the hydrogen storage canister 12, so that the purity of hydrogen is improved over 99.9999%. The principle of the hydrogen storage apparatus 24 shown in FIG. 5 and the hydrogen storage apparatus 10 shown in FIG. 2 is the same, and the related description is neglected.

Figure 6:
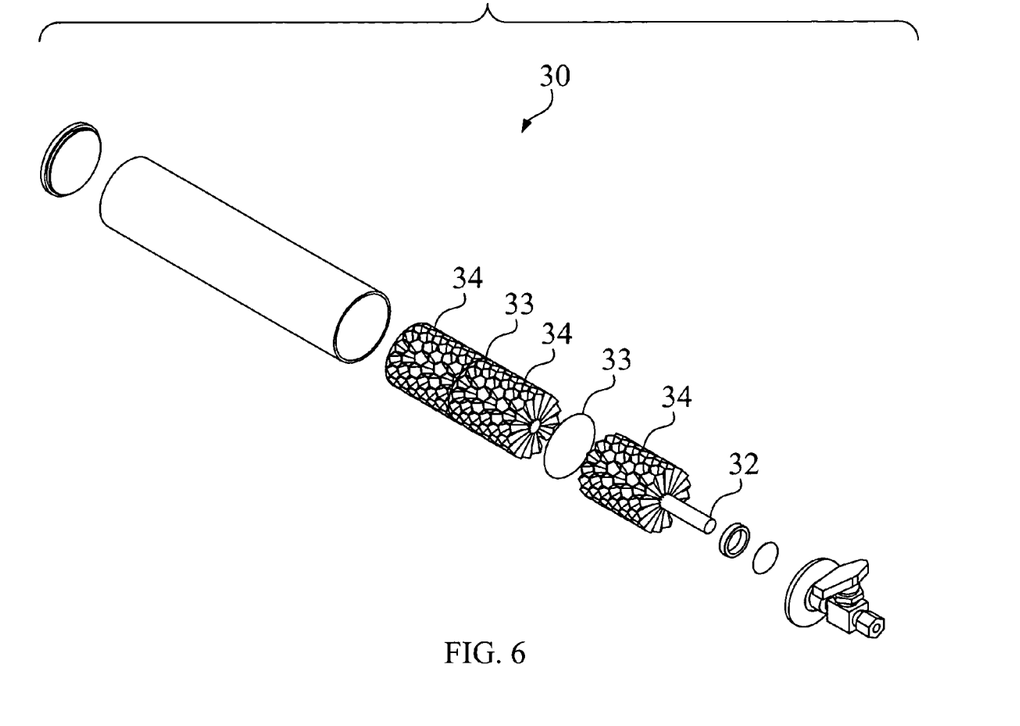
FIG. 6 is an exploded view illustrating a hydrogen storage apparatus according to another preferred embodiment of the present invention.

Referring to FIG. 6, FIG. 6 is an exploded view illustrating a hydrogen storage apparatus 30 according to another preferred embodiment of the present invention. The main difference between the hydrogen storage apparatus 30 and the hydrogen storage apparatus 10 is that the hydrogen storage apparatus 30 includes a filter center 32, two first partition 33, and three second partition 34. The filter center 32 is disposed through the center of each first partition 33 and each second partition 34 and is used for filtering the hydrogen, so the hydrogen stored in the lower hydrogen storage alloy can be released rapidly. Furthermore, the size of the second partition 34 of the hydrogen storage apparatus 30 is smaller than the second partition 14 of the hydrogen storage apparatus 10, so the second partition 34 is easier to be formed and the movement of the hydrogen storage alloy is less. The principle of the hydrogen storage apparatus 30 shown in FIG. 6 and the hydrogen storage apparatus 10 shown in FIG. 2 is the same, and the related description is neglected.

Figure 7:
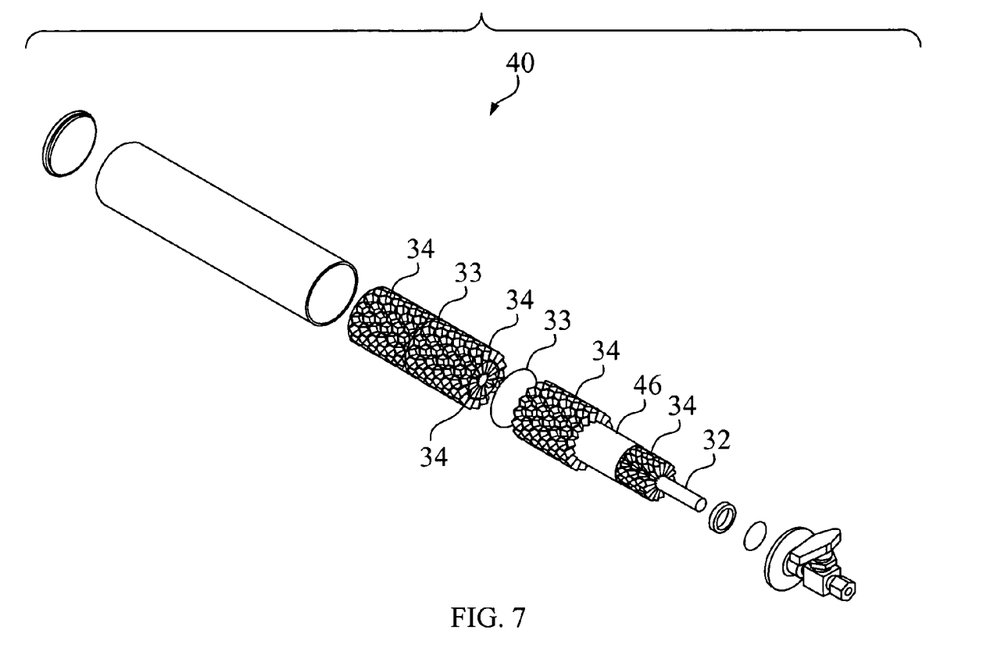
FIG. 7 is an exploded view illustrating a hydrogen storage apparatus according to another preferred embodiment of the present invention.

Referring to FIG. 7, FIG. 7 is an exploded view illustrating a hydrogen storage apparatus 40 according to another preferred embodiment of the present invention. The main difference between the hydrogen storage apparatus 30 and the hydrogen storage apparatus 40 is that the hydrogen storage apparatus 40 further includes three second partitions 34 disposed in each second partition 34 respectively. Each of the second partitions 34 is respectively covered by a second filter 46. Compared to the hydrogen storage apparatus 30, the hydrogen storage apparatus 40 separates the second partition into two layers (outer layer and inner layer) to further reduce the movement of the particles collapsed from the hydrogen storage alloy. Furthermore, when the size of the hydrogen storage canister is larger, the second partition having two layers is easier to be formed correspondingly. The principle of the hydrogen storage apparatus 40 shown in FIG. 7 and the hydrogen storage apparatus 10, 30 shown in FIGS. 2, 6 is the same, and the related description is neglected.

Figure 8:
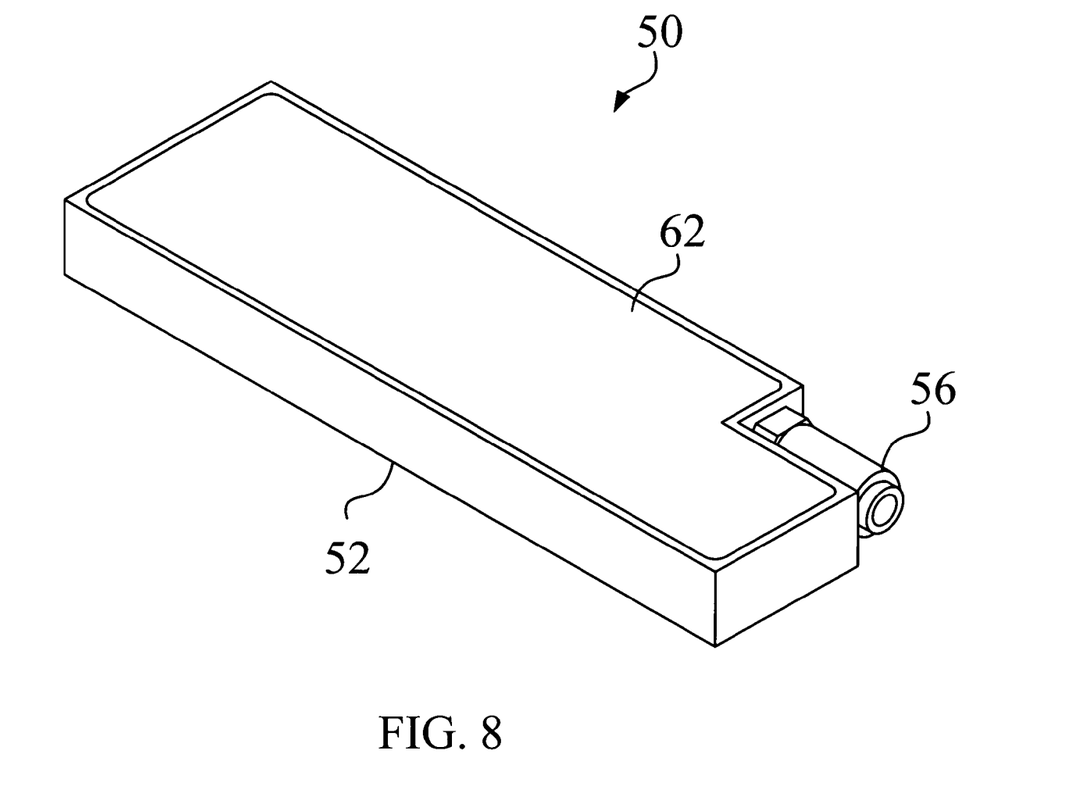
FIG. 8 is an outside view illustrating a hydrogen storage apparatus according to another preferred embodiment of the present invention.
Figure 9:
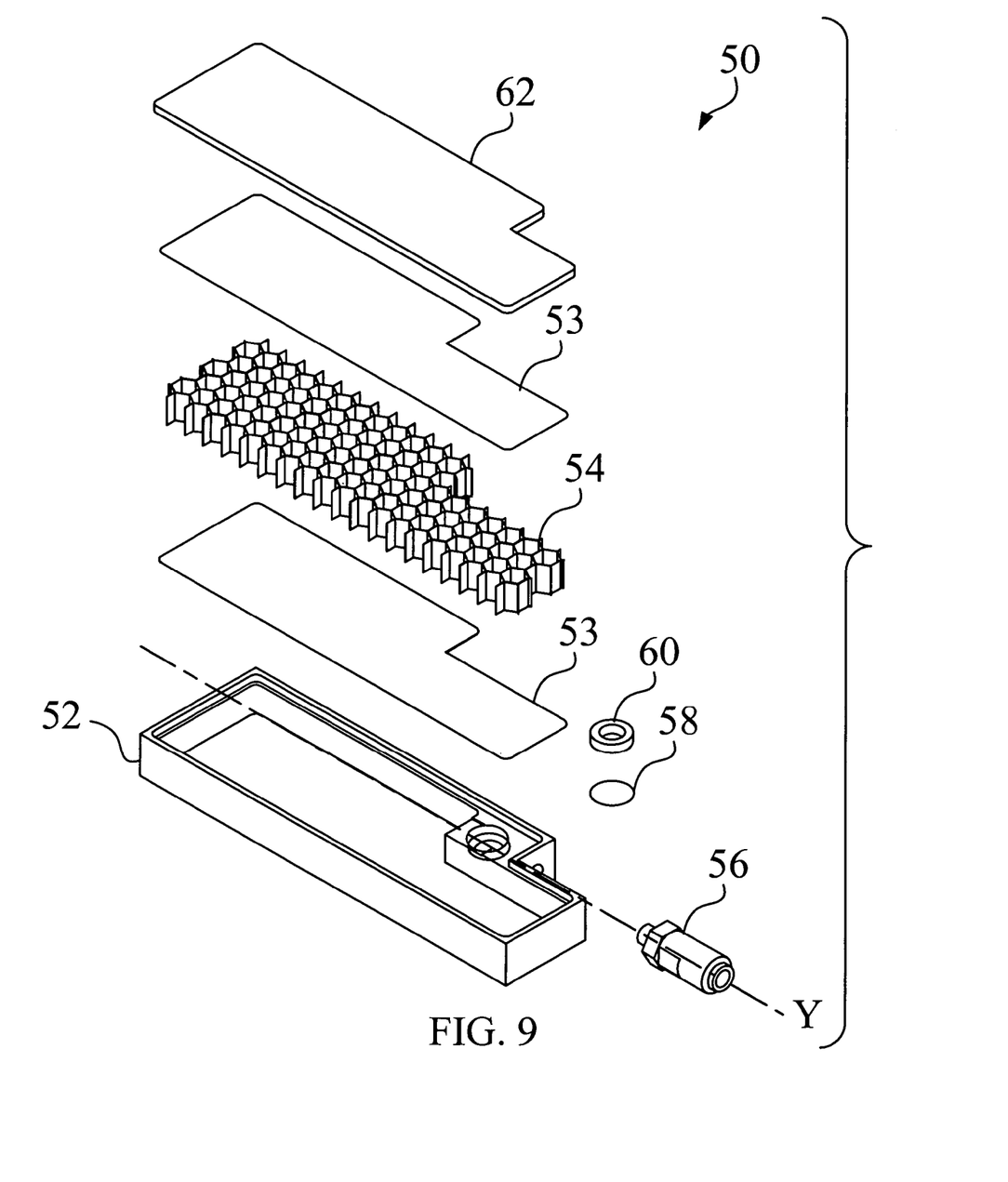
FIG. 9 is an exploded view illustrating the hydrogen storage apparatus shown in FIG. 8.

Referring to FIG. 8 and FIG. 9, FIG. 8 is an outside view illustrating a hydrogen storage apparatus 50 according to another preferred embodiment of the present invention. FIG. 9 is an exploded view illustrating the hydrogen storage apparatus 50 shown in FIG. 8. The hydrogen storage apparatus 50 is used for storing a hydrogen storage alloy (not shown). As shown in FIG. 9, the hydrogen storage apparatus 50 includes a hydrogen storage canister 52, at least one first partition 53, at least one second partition 54, a control valve 56, a first filter 58, a ring 60, and a top cover 62. The hydrogen storage canister 52 defines a longitudinal axis Y. In this embodiment, the hydrogen storage apparatus 50 includes two first partitions 53 and one second partition 54. The first partition 53 is a filter and adapted to divide the hydrogen storage canister 52 into at least one compartment. The first partition 53 can filter hydrogen and prevent the collapsed particles from passing through. In other words, only hydrogen can pass through the first partition 53. Furthermore, the first partition 53 is used for covering the outside of the second partition 54 to ensure the collapsed particles being in each of the cells, so as to prevent the hydrogen storage canister 52 from deforming resulted from non-uniform stress caused by larger movement of the collapsed particles.

The control valve 56 is used for controlling the flow of hydrogen into and out of the hydrogen storage canister 52. The ring 60 is used for fixing the corresponding first filter 58 onto the inner opening of the corresponding control valve 56, and the first filter 58 only permits hydrogen to pass through, so as to prevent the collapsed particles from shifting out while hydrogen is absorbed or released by the hydrogen storage apparatus 50. In a preferred embodiment, the porosity of the first filter 58 is designed to be under 1.0 micrometer. The top cover 62 is used for covering the top of the hydrogen storage canister 52 to prevent hydrogen and the hydrogen storage alloy from escaping, as shown in FIG. 8.

The second partition 54 is adapted to divide the at least one compartment into a plurality of sub-compartments into which the hydrogen storage alloy is disposed. The second partition 54 includes a plurality of cells having a cell wall arranged in a honeycomb configuration. The cell wall of each of the plurality of cells is perpendicular to the longitudinal axis Y. The hydrogen storage alloy is disposed in each cell of the second partition 54, so the collapsed particles of the hydrogen storage alloy will not gather at the bottom of the hydrogen storage canister 52. Furthermore, the second partition 54 is flexible, such that the size of the plurality of sub-compartments is adjustable, as shown in FIG. 3. Accordingly, the size of the plurality of sub-compartments can be changed based on various requirements, so as to improve the efficiency of heat transfer.

Figure 10A:
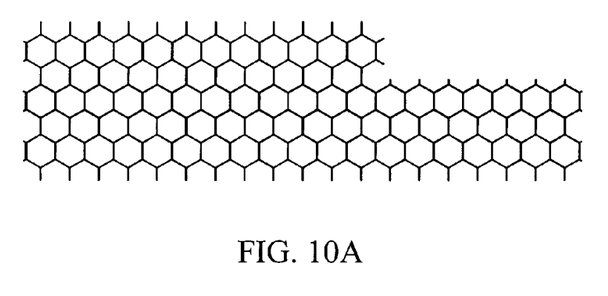
FIG. 10A is a top view illustrating the second partition shown in FIG. 9.
Figure 10B:
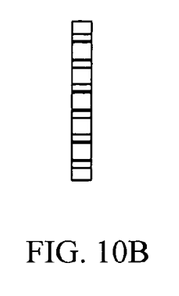
FIG. 10B is a side view illustrating the second partition shown in FIG. 9.

Referring to FIG. 10A and FIG. 10B, FIG. 10A is a top view illustrating the second partition 54 shown in FIG. 9. FIG. 10B is a side view illustrating the second partition 54 shown in FIG. 9. Because the cell wall of each cell of the second partition 54 is perpendicular to the longitudinal axis Y, the area that second partition 54 contacts the top and bottom walls of the hydrogen storage canister 52 is increased, so as to improve the efficiency of heat transfer, as shown in FIG. 10A. The side surface of the second partition 54 has a rectangle-shaped honeycomb configuration as shown in FIG. 10B. Because the hydrogen storage alloy is restrained in each cell of the second partition 54, the hydrogen storage apparatus 50 of the present invention is suitable for the application of vertical type or horizontal type.

Figure 11:
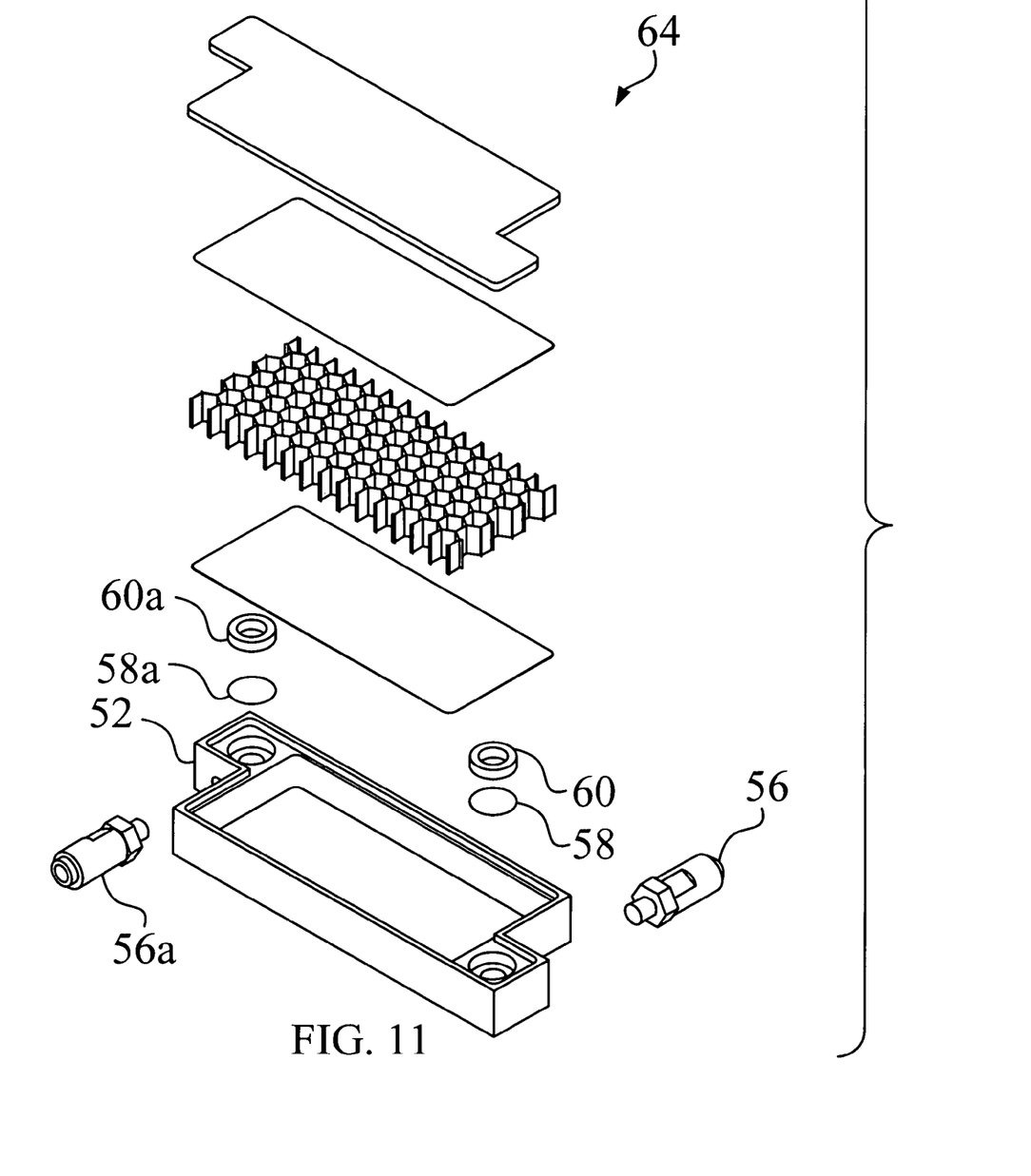
FIG. 11 is an exploded view illustrating a hydrogen storage apparatus according to another preferred embodiment of the present invention.

Referring to FIG. 11, FIG. 11 is an exploded view illustrating a hydrogen storage apparatus 64 according to another preferred embodiment of the present invention. The main difference between the hydrogen storage apparatus 64 and the hydrogen storage apparatus 50 is that the hydrogen storage apparatus 64 further includes a control valve 56a, a first filter 58a, and a ring 60a. The function and principle of the control valve 56a, the first filter 58a, and the ring 60a are respectively the same as the control valve 56, the first filter 58, and the ring 60. When the hydrogen storage apparatus 64 absorbs hydrogen completely, the control valves 56 and 56a may be opened at the same time, and hydrogen with high purity can be blown into the hydrogen storage canister 52. Accordingly, the gas impurities, not absorbed by the hydrogen storage alloy, will be blown out of the hydrogen storage canister 52, so that the purity of hydrogen is improved over 99.9999%. The principle of the hydrogen storage apparatus 64 shown in FIG. 11 and the hydrogen storage apparatus 50 shown in FIG. 9 is the same, and the related description is neglected.

Figure 12:
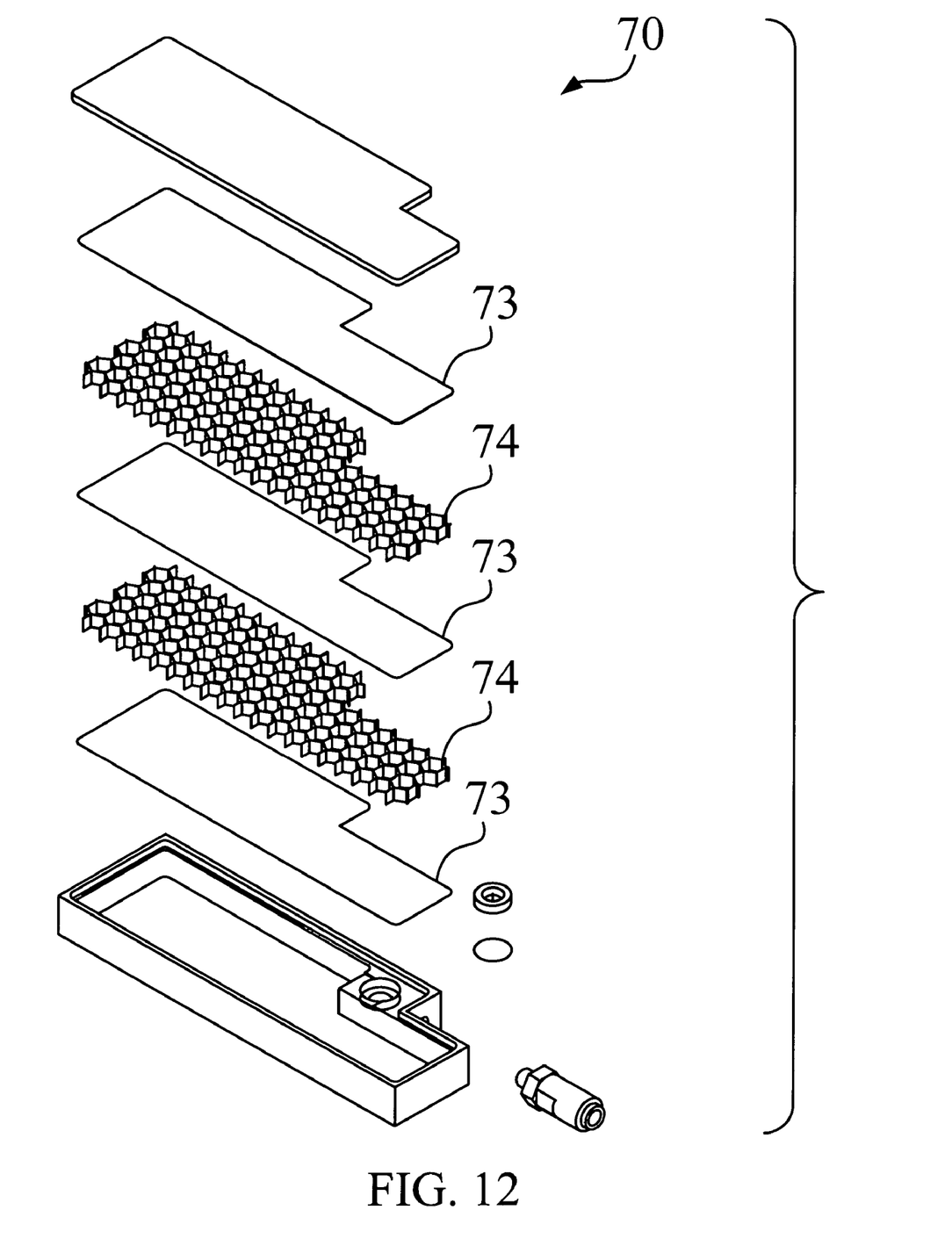
FIG. 12 is an exploded view illustrating a hydrogen storage apparatus according to another preferred embodiment of the present invention.

Referring to FIG. 12, FIG. 12 is an exploded view illustrating a hydrogen storage apparatus 70 according to another preferred embodiment of the present invention. The main difference between the hydrogen storage apparatus 70 and the hydrogen storage apparatus 50 is that the hydrogen storage apparatus 70 includes three first partitions 73 and two second partitions 74. Compared to the hydrogen storage apparatus 50, the hydrogen storage apparatus 70 separates the second partition into two layers to further reduce the movement of the particles collapsed from the hydrogen storage alloy. The principle of the hydrogen storage apparatus 70 shown in FIG. 12 and the hydrogen storage apparatus 50 shown in FIG. 9 is the same, and the related description is neglected.

Compared to the prior art, the hydrogen storage apparatus of the present invention not only improves the efficiency of heat transfer but also ensures the collapsed particles being in each of the cells, so as to prevent the hydrogen storage canister from deforming resulted from non-uniform stress caused by larger movement of the collapsed particles. Furthermore, the purity of hydrogen can be improved by utilizing two control valves. Moreover, the hydrogen storage apparatus is suitable for the application of vertical type or horizontal type.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A hydrogen storage apparatus for storing a hydrogen storage alloy, the hydrogen storage apparatus comprising:
   a hydrogen storage canister defining a longitudinal axis;
   at least one first partition adapted to divide the hydrogen storage canister into at least one compartment; and
   at least one second partition adapted to divide the at least one compartment into a plurality of sub-compartments into which the hydrogen storage alloy is disposed;
   wherein the at least one second partition comprises a plurality of cells having a cell wall arranged in a honeycomb configuration, each cell of the plurality of cells being identical in size and shape, and the cell wall of each of the plurality of cells is perpendicular to the longitudinal axis.

2. The hydrogen storage apparatus of claim 1, wherein the hydrogen storage canister comprises at least one control valve for controlling the flow of hydrogen into and out of the hydrogen storage canister.

3. The hydrogen storage apparatus of claim 2, wherein the hydrogen storage canister further comprises at least one first filter and at least one ring, each of the at least one ring is used for fixing the corresponding first filter onto the bottom of the corresponding control valve, and the at least one first filter only permits the hydrogen to pass through.

4. The hydrogen storage apparatus of claim 3, wherein the porosity of the first filter is under 1.0 micrometer.

5. The hydrogen storage apparatus of claim 1, wherein the at least one first partition is an alloy holding separator.

6. The hydrogen storage apparatus of claim 1, wherein the at least one second partition is flexible, such that the size of the plurality of sub-compartments is adjustable.

7. The hydrogen storage apparatus of claim 1, wherein the at least one second partition is a polygonal prism shaped second partition having a rectangle-shaped honeycomb configuration.

8. The hydrogen storage apparatus of claim 1, wherein the at least one second partition is a fan-shaped second partition having a honeycomb configuration.

9. The hydrogen storage apparatus of claim 8, further comprising a filter center, disposed through the center of the at least one first partition and the at least one second partition, for filtering the hydrogen.

10. The hydrogen storage apparatus of claim 9, further comprising at least one second filter for covering the outside of the at least one second partition.

* * * * *